United States Patent

Gallery et al.

[11] Patent Number: 5,982,353
[45] Date of Patent: Nov. 9, 1999

[54] VIRTUAL BODY MODELING APPARATUS HAVING DUAL-MODE MOTION PROCESSING

[75] Inventors: Richard D. Gallery, Horley; Jain K. Shah, London; Dale R. Heron, Crawley, all of United Kingdom

[73] Assignee: U.S. Philips Corporation, New York, N.Y.

[21] Appl. No.: 08/881,649

[22] Filed: Jun. 24, 1997

[30] Foreign Application Priority Data

Jun. 25, 1996 [GB] United Kingdom .................. 9613315

[51] Int. Cl.⁶ .............................. G09G 5/00; G06F 3/033
[52] U.S. Cl. ............................................. 345/156; 345/158
[58] Field of Search ................................... 345/156, 8, 7, 345/158; 463/8

[56] References Cited

U.S. PATENT DOCUMENTS

| | | | |
|---|---|---|---|
| 4,988,981 | 1/1991 | Zimmerman et al. | 340/709 |
| 5,185,561 | 2/1993 | Good et al. | 318/432 |
| 5,583,526 | 12/1996 | Socks et al. | 345/8 |
| 5,616,078 | 4/1997 | Oh | 463/8 |
| 5,670,987 | 9/1997 | Doi et al. | 345/156 |
| 5,757,360 | 5/1998 | Nitta et al. | 345/156 |

FOREIGN PATENT DOCUMENTS

WO 9218925  4/1992  WIPO ............................ G06F 3/00

*Primary Examiner*—Jeffery Brier
*Attorney, Agent, or Firm*—Gregory L. Thorne

[57] ABSTRACT

An apparatus is provided for modelling and interacting with a virtual environment. An image of the environment, and a representation of the user's presence therein, is generated by a CPU (12) based on data from memories (14,16) and supplied to the user by a stereoscopic display (10). The user is provided with a hand-held unit (18) which has a single control button (20). When the button (20) is not pressed, the user's movements of the control (18) are replicated by a modelled icon (such as a virtual hand) within the virtual environment to enable interaction. When the button (20) is actuated, the user's movements of control device (18) are instead converted to navigational commands shifting the location of the user's virtual presence around the virtual environment.

8 Claims, 3 Drawing Sheets

VIRTUAL BODY MODELING APPARATUS HAVING DUAL-MODE MOTION PROCESSING

BACKGROUND OF THE INVENTION

The present invention relates to an apparatus for controlling the movement of a virtual body or body part, where the virtual body or body part is a computer-based model that represents human, animal or mechanistic, form in a computer-generated virtual environment.

The form taken by the virtual environment will depend on the intended use of the system and may, for example, comprise the interior of a building for an architectural modelling application, or urban or surreal landscapes for games or other applications, around which environment a virtual body controlled by the user is moved. The form of the virtual body may vary as required by the application, from little more than a simple cursor to a detailed or stylised model of a humanoid or animal body, subject to constraint in terms of available processor power for rendering of such models. In the following, the term "virtual environment" will be used for such virtual landscapes or situations: the term "physical environment" will be used to denote the 'real-world' surroundings of the user, for example a room in which the user contacts the various hardware devices, such as a head-mounted display (HMD), which provide the interface to the virtual environment. The terms "virtual body" and "physical body" should be construed accordingly.

One example of a virtual body control device in the form of a haptic glove is described in International Patent Application WO92/18925 (W. Industries). Within the virtual environment (viewed for example via HMD) the users hand appears as a cursor which undergoes changes corresponding with movement and flexure of the users hand. Contact between the cursor and objects within the virtual environment is simulated by inflating cushion portions of the glove to give a sensation of touch. Whilst the haptic glove is useful—if expensive—for relatively localised techniques (such as hands-on molecular modelling) within a virtual world where the object is to provide a sense of realism for the user via tactile feedback, the motion around the virtual environment is limited to the user's arm motion unless the glove is combined with additional devices such as bodysuits and/or treadmills to enable further movement. A problem which then arises is complexity of control for the differing devices, with the resulting requirement to memorise different operational commands or operations being at variance with achieving a state of user-immersion in the virtual environment.

OBJECT AND SUMMARY OF THE INVENTION

It is therefore an object of the present invention to provide a means for manipulating a modelled virtual body which is not limited by the range of motions of the user.

It is a further object of the present invention to provide a relatively simple means of navigating within a virtual environment which is relatively simple to learn to operate.

In accordance with the present invention there is provided a virtual body modelling apparatus operable to generate and animate under user direction a representation of a body in a virtual environment, the apparatus comprising: a first data store, holding data defining the virtual environment; a second data store, holding data related to features of the virtual body representation; a user-operable control device; and processing means arranged to generate a representation of the virtual environment based on data from the first data store and from a first viewpoint, to generate the body representation within the virtual environment based on data from the second data store, and to periodically modify the generated body representation in response to signals received from the user-operable control means; characterised in that the apparatus further comprises position determination means arranged to detect a location of said control device relative to a predetermined origin position, said control device further comprises a single user actuatable control, and said processing means is arranged to either periodically modify said generated body representation or periodically modify the position of the said first viewpoint and regenerate the representation therefrom in dependence on the operation of the user actuatable control.

By having only a single user actuable control, such as a simple push-button, there is little for the user to remember in terms of operational instruction, only that (for example) without the button depressed, the virtual body follows the control device motions but with it depressed, the virtual "user" as a whole can navigate the virtual environment using the same control.

The second data store may hold data defining at least one sequence of body motions, with the processor being arranged to call said sequence data and modify the generated body representation such as to follow the sequence of motions on detection of one or more predetermined signals from the user-operable control device.

The user-operable control device may comprise a unit to be held in a users hand, (suitably with the single control being actuatable by a finger or thumb of that hand) and the position detection means may comprise a fixed position positioning data source transmitting positioning data to the hand held unit which is arranged to determine its position from the received positioning data and output an indication of the same to the processor. Alternatively, the position determination means may comprise a fixed position sensor located adjacent an operating area for the user-operable input device and arranged to determine the relative position of the device to the origin position.

Suitably, the processor may be enabled to modify the said predetermined origin position in response to user input, for example to allow flexibility for different users with each being enabled to select their own comfortable "rest" position. Alternatively, the processor may be arranged to determine the origin position by time-averaging positional readings for the user-operable input device for a predetermined period following actuation of the position determination means.

BRIEF DESCRIPTION OF THE DRAWINGS

Further features and advantages of the present invention will become apparent from reading of the following description of preferred embodiments of the invention, by way of example only, and with reference to the accompanying drawings, in which.

DESCRIPTION OF THE PREFERRED EMBODIMENTS

The following description is specifically concerned with modelling and controlling a virtual hand or claw, whether in isolation or as part of a virtual humanoid body that a user or participant in a virtual world may control, with the mechanism for control of the hand or claw movements being directed by measured movement of a hand-held device operated by the user. As will be readily appreciated, many of the techniques described may also be used for controlling movement of other parts of a virtual body.

Figure 1:
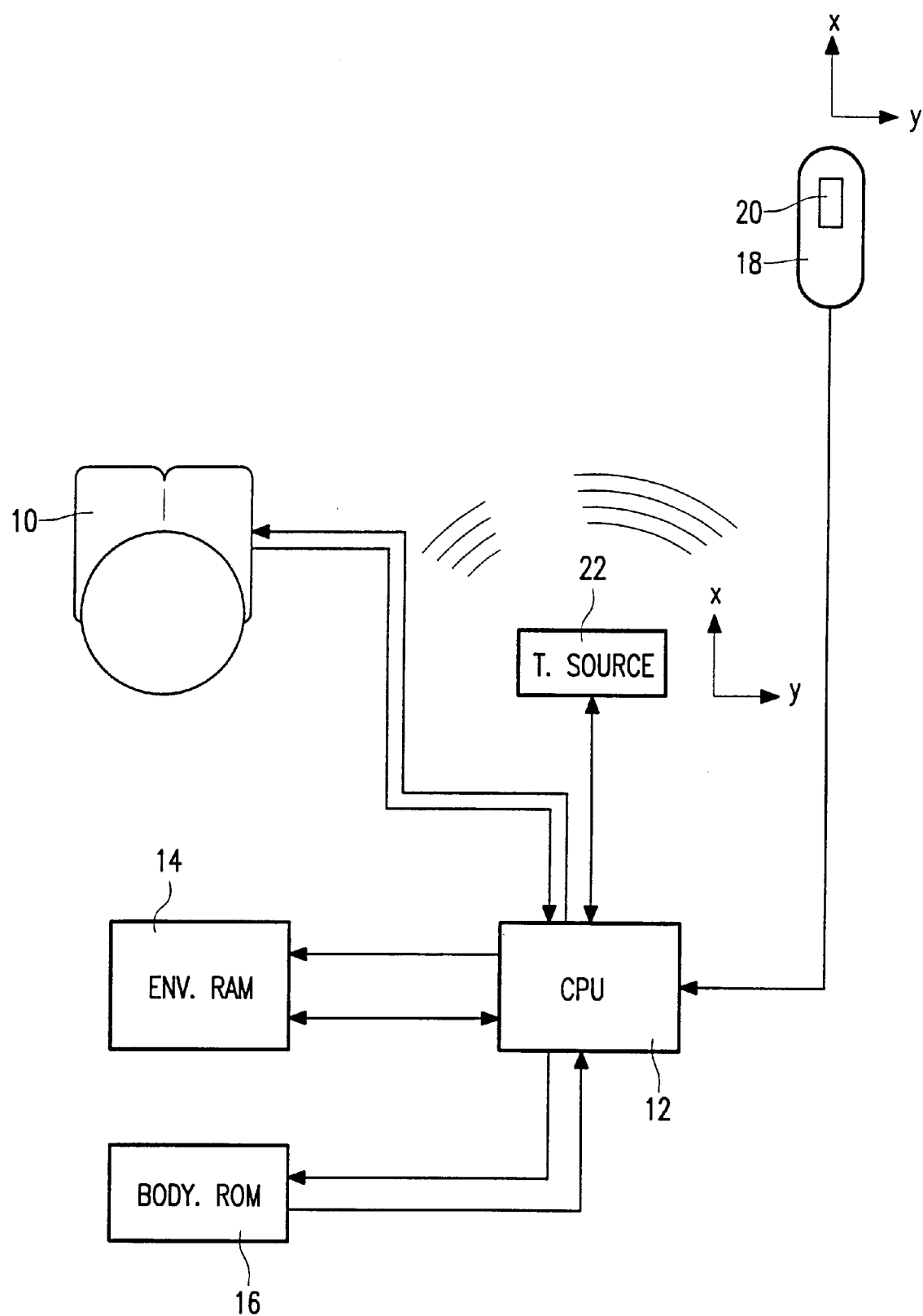
FIG. 1 is a plan schematic view of a virtual environment interaction apparatus embodying the invention.

The arrangement for measuring the movement of the user hand is via an apparatus which translates the current physical position of a hand-held control into a measurement appropriate for input to a data processor. An embodiment of such an apparatus is illustrated in FIG. 1 which shows a plan view comprising a stereoscopic HMD unit 10 driven by a CPU 12 to display images of a virtual environment from a movable viewpoint. The images of the environment are based on data from an environmental data store RAM 14 whilst the images of the virtual body within the environment (such as a hand or claw which may be moved by the user and used to manipulate objects within the virtual environment) are based on data in a read only memory 16 also coupled with the CPU 12.

A hand-held user control 18 is provided, coupled with the CPU 12, which control has a single actuating push-button 20 which may suitably be operated by a finger or thumb of the hand gripping it.

In a fixed position at the edge of the area where the user will be positioned, a source 22 of tracking signals is provided. This source 22 suitably outputs source coordinate axes data in the form of a dipole electromagnetic field which field is detected by both the HMD 10 and the control device 18: on the basis of the coordinate data received and fed back to the CPU, it can be determined at any given time where both the HMD 10 and control device 18 are in relation to the three-dimensional coordinate set specified in the output from source 22.

For reasons which will become apparent, it is necessary for there to be a "rest" position for the control device 18 and the first technique for establishing is for a user, on first donning the headset and picking up the control device, to indicate a comfortable position. The respective coordinates of the HMD 10 and control device 18 are then logged. In an automated alternative, the respective positions are measured for a predetermined period following powering up of the system, for example the first 20 seconds, and a time average value for these positions may then be selected as the rest positions.

Figure 2:
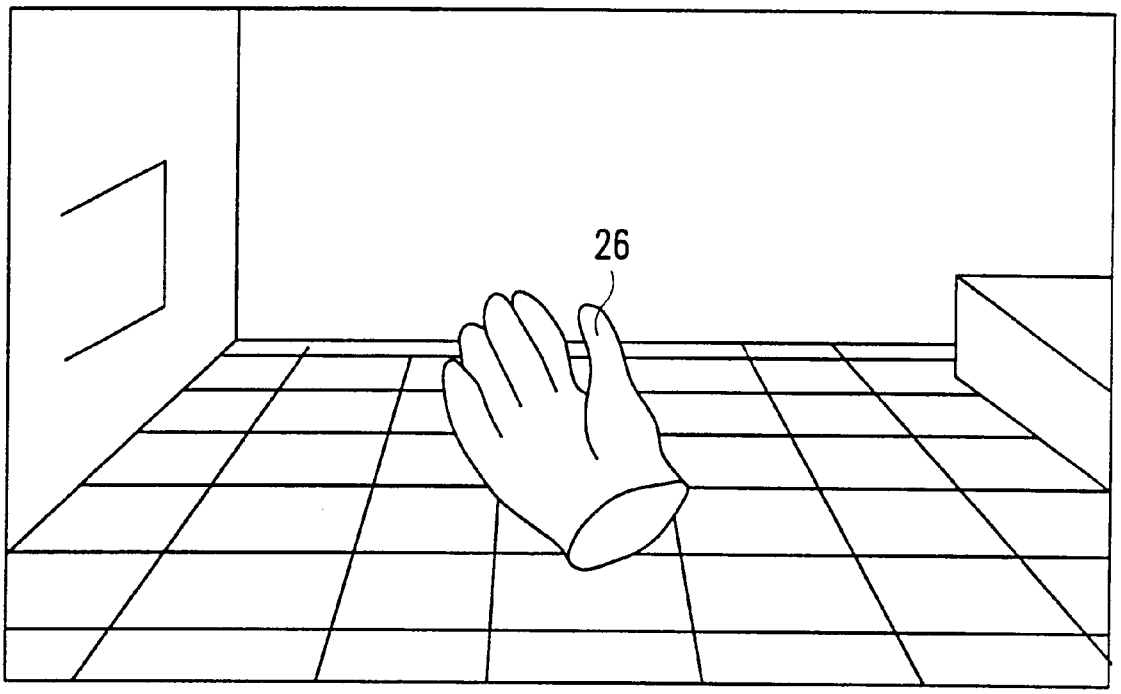
FIG. 2 illustrates a typical image presented to the user of the apparatus of FIG. 1.

Once the interactive session has begun, the user is presented via the HMD 10 with an image, such as shown in FIG. 2, of a hand or claw floating within the virtual environment. Whilst the button 20 on the control device 18 is not depressed, the three-dimensional movements that the user makes with the control device 18 are replicated by the movements of the virtual hand 26 within the virtual environment. The movements of the HMD 10 are also replicated in changes to the location of viewpoint from which the image of the virtual environment is rendered, although it will be appreciated that this movement will be limited as physical movement is constrained by the apparatus.

For greater movement, in order to navigate around the virtual environment, the system is configured such that when the button 20 on the control device 18 is depressed, the user's movements of the control device 18 shift the location of the user's virtual presence about the virtual environment instead of manipulating the hand body portions.

Figure 3:
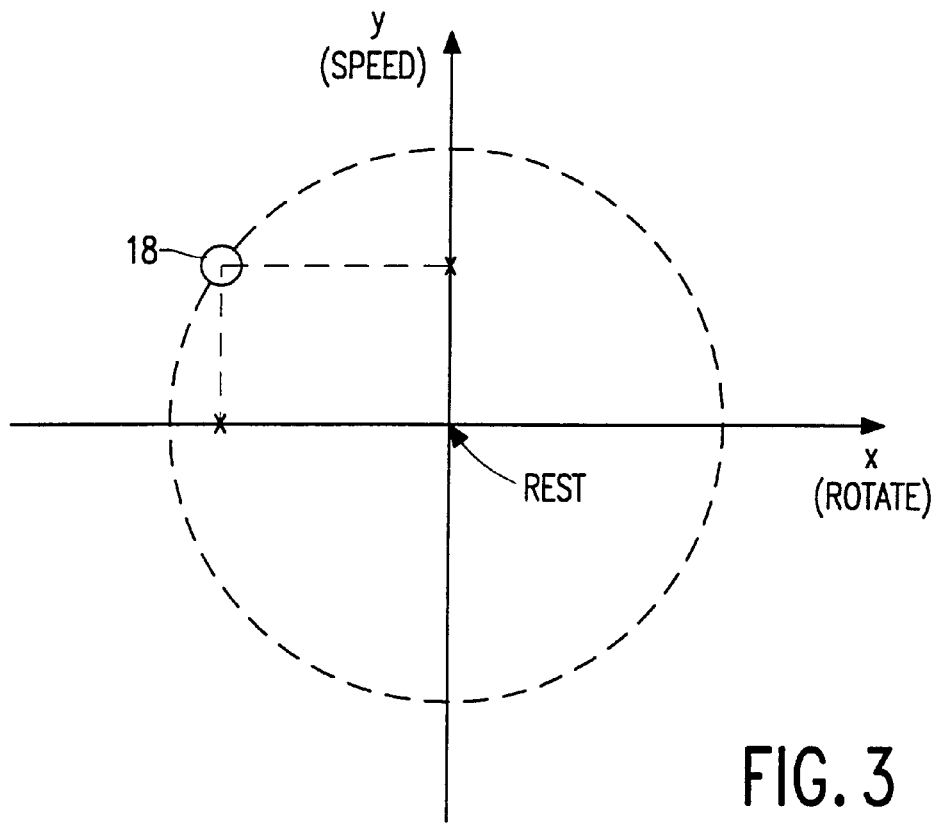
FIGS. 3 and 4 represent the conversion of positional data for the handset of FIG. 1 to navigational data for within the virtual environment.
Figure 4:
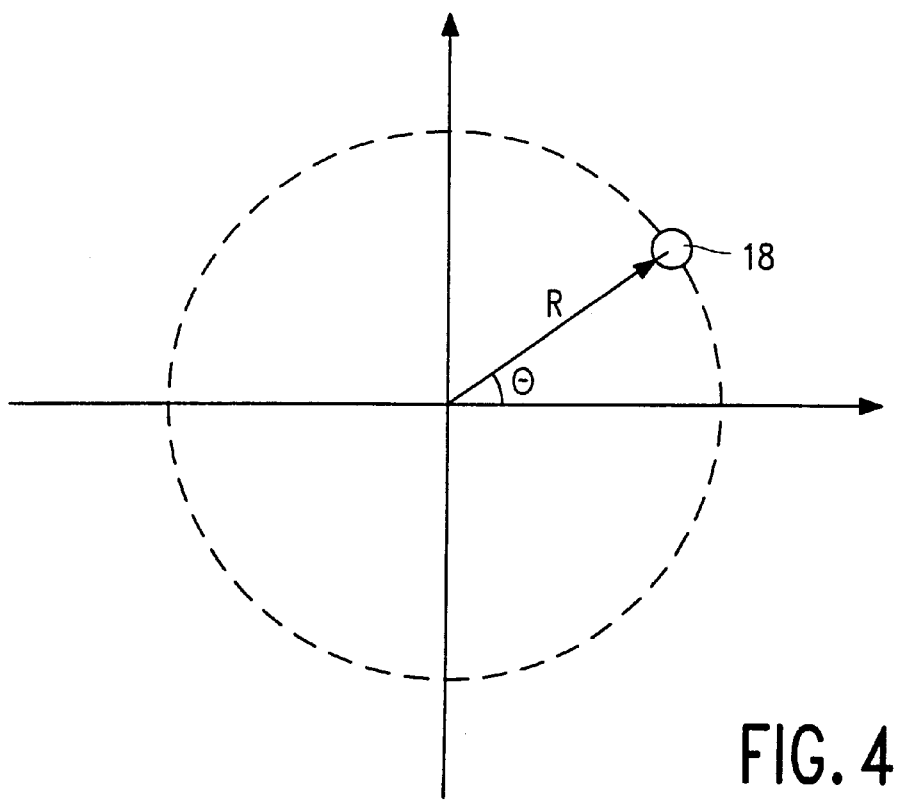

FIGS. 3 and 4 illustrate two alternative methods for using the positional changes of the device 18 to navigate the virtual environment: in each case, the centre of the respective circles represents the rest position for the device 18, established as explained above. In terms of the FIG. 3 embodiment, the offsets in the X and Y directions dictate the orientation and speed respectively. For example, the higher the value of Y the greater the speed of movement through the virtual environment (with reversing being possible through negative values of Y) with the positive or negative setting of X deciding whether the movement is turning towards the right or the left.

In a similar manner, the radius R and angle $\theta$ indicated in FIG. 4 may instead be used to control the speed and orientation. As will be well understood, these changes to speed and orientation may be either incremental or absolute depending possibly on the requirements or wishes of the user.

In order to improve this approach, an adaptive mechanism may be included for the positional measurement inputs to the CPU. Such a mechanism suitably adapts on the fly to the positional measurements from the handset and/or HMD, to translate the users erratic, variable measurements into a steady motion. Any of a number of adaptive mechanisms, such as adaptive filters and neural networks, may be used. In addition, certain physical movements or user inputs may be used as a trigger, with a generated or modelled sequence of virtual body motions being initiated—regardless of what motions the user may make whilst the sequence replays.

From reading the present disclosure, other modifications and variations will be apparent to persons skilled in the art. Such modifications and variations may involve other features which are already known in the art and which may be used instead of or in addition to features already described herein. Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applications hereby give notice that new claims may be formulated to such features and/or combinations of such features during prosecution of the present application or of any application derived therefrom.

What is claimed is:

1. Virtual body modelling apparatus operable to generate and animate under user direction a representation of a body in a virtual environment, the apparatus comprising:

a first data store, holding data defining the virtual environment;

a second data store, holding data related to features of the virtual body representation;

a user-operable control device;

processing means arranged to generate a representation of the virtual environment based on data from the first data store and from a first viewpoint, to generate the body representation within the virtual environment based on data from the second data store, and to periodically modify the generated body representation in response to signals received from the user-operable control means; and position determination means arranged to detect a location of said control device relative to a predetermined origin position, said user operable control device comprising a single user actuatable control, and said processing means being arranged to either periodically modify said generated body representation or periodically modify the position of the said first viewpoint and regenerate the representation therefrom in dependence on the operation of the user actuatable control.

2. Apparatus as claimed in claim 1, wherein said second data store holds data defining at least one sequence of body motions, and the processor is arranged to call said sequence data and modify the generated body representation such as to follow the sequence of motions on detection of one or more predetermined signals from the user-operable control device.

3. Apparatus as claimed in claim 2, wherein the user-operable control device comprises a unit to be held in a users hand with the user control being actuatable by a finger or thumb of that hand.

4. Apparatus as claimed in claim 1, wherein the user-operable control device comprises a unit to be held in a users hand with the user control being actuatable by a finger or thumb of that hand.

5. Apparatus as claimed in claim 4, wherein said position detection means comprises a fixed position positioning data source transmitting positioning data to the user-operable control device including means operable to determine the device position from the received positioning data, relative to the predetermined origin position, and output an indication of same to the processor.

6. Apparatus as claimed in claim 4, wherein said position determination means comprises a fixed position sensor located adjacent an operating area for the user-operable control device and arranged to determine the relative position of the device to the predetermined origin position.

7. Apparatus as claimed in claim 1, wherein the processor means is enabled to modify the predetermined origin position in response to user input.

8. Apparatus as claimed in claim 1, wherein the processor means determines the predetermined origin position by time-averaging positional readings for the user-operable control device for a predetermined period following actuation of the position determination means.

* * * * *